United States Patent

Paul

[15] 3,693,403
[45] Sept. 26, 1972

[54] GAS ANALYSIS APPARATUS AND METHOD USING PARALLEL GAS DENSITY DETECTORS AND DIFFERENT CARRIER GASES TO DETERMINE MOLECULAR WEIGHT

[72] Inventor: Donald G. Paul, Kennett Square, Pa.

[73] Assignee: Chemalytics Corporation, Unionville, Pa.

[22] Filed: Nov. 9, 1970

[21] Appl. No.: 87,680

[52] U.S. Cl. ..........................73/30, 73/23, 73/23.1
[51] Int. Cl. .........................G01n 9/00, G01n 31/08
[58] Field of Search............................73/23.1, 23, 30

[56] References Cited

UNITED STATES PATENTS

| | | | |
|---|---|---|---|
| 3,585,002 | 6/1971 | Boys | 73/23.1 X |
| 3,356,458 | 12/1967 | Steinle et al. | 73/23.1 X |
| 3,385,101 | 5/1968 | Roof | 73/23.1 |
| 3,408,854 | 11/1968 | Larson | 73/23.1 |
| 3,545,255 | 12/1970 | Levy et al. | 73/30 |

OTHER PUBLICATIONS

Parsons, " Bracket Method for Molecular Weight Determination of Pyrolysis Products Using Gas Chromatography with a Gas Density Detector," Analytical Chemistry, Vol. 36, No. 9, August, 1964, pp. 1849-1852.

Lovelock et al., " The Palladium Transmodulator: A New Component for the Gas Chromatograph," Analytical Chemistry, Volume 41, No. 8, July, 1969, pp. 1048- 1052.

Primary Examiner—Richard C. Queisser
Assistant Examiner—C. E. Snee, III
Attorney—Mortenson and Weigel

[57] ABSTRACT

A method and apparatus are provided for measurement of a function of the molecular weight of a volatile chemical compound of a sample and the absolute weight contained therein by dividing a flow of volatilized sample into a plurality of portions having a fixed volume proportion to each other, trapping the chemical compound from each of said portions separately in trapping means, transferring the chemical compound of each of said portions into different carrier gases, said carrier gases differing in molecular weight from each other and from the chemical compound of the sample to form separate flows and passing the separate flows through separate means of the recording gas density cell type whereby signal outputs are obtained, the ratio of any two signal outputs being a function of the molecular weight of the compound, the means for trapping of the chemical compound to be measured preferably including a chromatographic tube when more than a single component is present.

13 Claims, 6 Drawing Figures

INVENTOR
DONALD G. PAUL

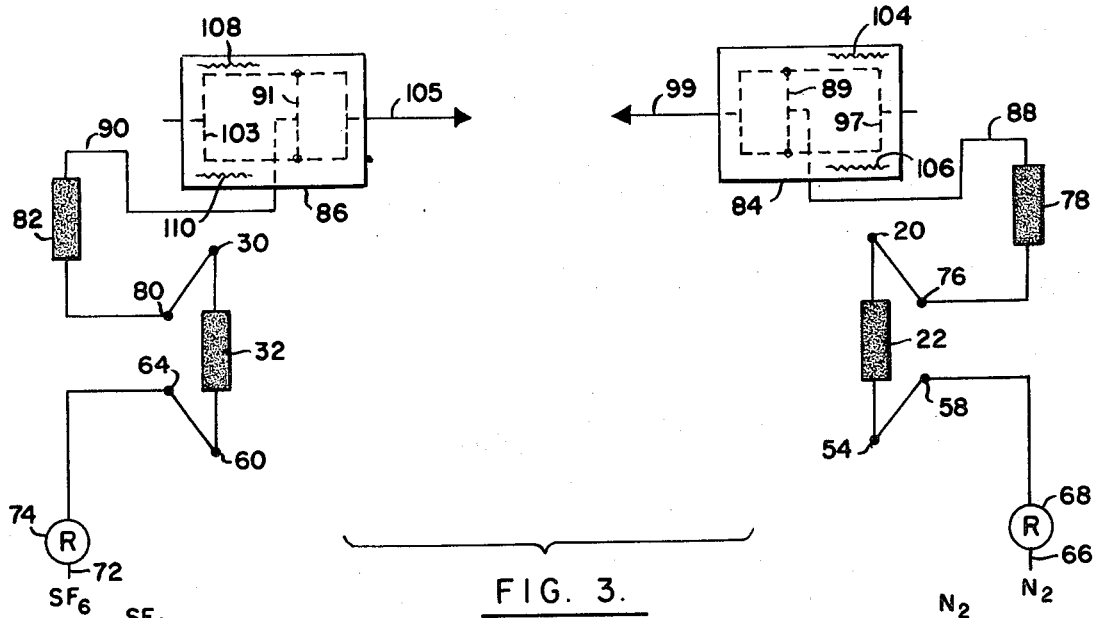
FIG. 3.
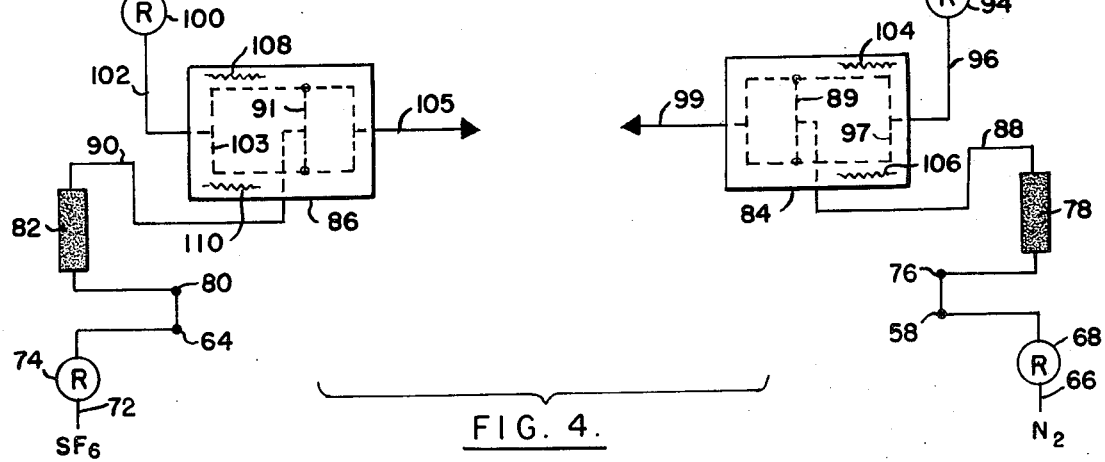
FIG. 4.
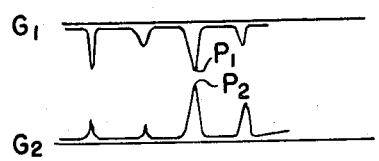
FIG. 5.
(1) $W_1 = A_1 K_1 \left( \dfrac{M_x}{M_x - M_{C1}} \right)$
(2) $W_2 = A_2 K_2 \left( \dfrac{M_x}{M_x - M_{C2}} \right)$
(3) $W_1 = a_1 W_T$
(4) $W_2 = a_2 W_T$
(5) $\dfrac{K_1}{K_2} \cdot \dfrac{a_2}{a_1} \cdot \dfrac{A_1}{A_2} = \dfrac{M_x - M_{C1}}{M_x - M_{C2}}$
FIG. 6.

GAS ANALYSIS APPARATUS AND METHOD USING PARALLEL GAS DENSITY DETECTORS AND DIFFERENT CARRIER GASES TO DETERMINE MOLECULAR WEIGHT

BACKGROUND OF THE INVENTION

This invention relates to a method and apparatus for analysis of volatile substances as a function of molecular weight and more particularly to a method and apparatus for direct determination of molecular weight of substances.

It is known to determine molecular weight by the use of a gas density detector cell (gas density balance) in which a ratio of electrical resistance between upper and lower electrical elements varies by heat interchange created from difference of flows of sample, carrier gas and reference gas as measured with a bridge circuit.

This prior art procedure involves programming a flow from a gas chromatography unit to a gas density balance and measuring the electrical resistance as it changes during flow of the sample through the gas density cell. The gas density balance divides a flow of a reference gas into an upper and a lower path the rate of flow of each being measured by electrical detectors. When a sample in the same reference gas as a carrier gas is fed into the cell, a sample of molecular weight (gas density) lower than that of the reference gas rises to the upper path and retards the flow of the upper path and a differential between the electrical output of the detectors is created. Conversely, a sample of molecular weight higher than that of the reference gas falls to the lower path and retards the flow of the lower path so that a differential which is electrically measurable by the output of the detectors is similarly produced. By repeating the process with a second carrier gas different from the first used gas and using identical flow rates in the same apparatus Liberti et al. (atti. accad. nazl. Lincei. Rend. 20,623(1956) ) obtained molecular weight results accurate to within 4 percent.

The procedure of Liberti et al. required exact replications of sample weights, identical replication of flow rates, heating temperatures, sample treatment, and recording rate. Moreover, any handling and loss errors were required to be identical. For these reasons, no success in practical use of the procedure for molecular weight determination of unknown samples ever evolved. In spite of the rapid growth in gas chromatography, developments since the discovery of Liberti et al. have always taken paths which required more complicated additional apparatus for qualitative analysis of the sample, such as mass spectrometry, infra-red analysis and the like. Since the retention time of a sample in the chromatographic system does not necessarily deliver components of a sample in order of molecular weight these later developments have not led to a simple method of determination of molecular weight without resort to further analysis.

Now it is an object of the present invention to provide a method and apparatus for the direct determination of the molecular weight of a chemical compound.

It is a further object to provide a method and apparatus for determining the molecular weights of individual components of a chemical mixture.

It is a still further object to provide a method and apparatus for simultaneous determination of retention times and molecular weights of chemical compounds for qualitative analysis thereof.

It is also an object to provide a method and apparatus for determination of both molecular weight and absolute weight of individual components of a chemical mixture.

It is a still further object to provide a method and apparatus for direct determination of molecular weight and/or absolute weight of a chemical compound in a mixture using a single sample and two different carrier gases.

It is yet another object to provide a method and apparatus for determination of the molecular weight of a chemical compound using a single sample and a plurality of different carrier gases is apparatus standardized by one standardization for the combination of carrier gases used under predetermined conditions.

These objects are achieved by apparatus comprising means for dividing a flow of sample containing a chemical compound into a plurality of flows each containing a portion of said sample in fixed proportion to the whole; a plurality of trapping means for trapping the chemical compound from each flow and subsequently releasing the compound into a different carrier gas in each trapping means; means for introducing a different carrier gas into each trapping means to form a flow of said compound in the respective different carrier gas; means including a plurality of gas density detectors flowably connected to each trapping means for detection of the chemical compound contained therein and flowably connected to a flow of reference gas of the same chemical composition as the carrier gas containing the sample portion, said gas density detector being capable of providing an electrical signal that varies in accordance with the flow rate of the reference gas and the flow rate of the reference gas as modified by the compound flowing from said trapping means into the detector cell.

These objects are further achieved by the method of dividing a sample containing a chemical compound into a plurality of portions having a fixed quantitative proportion to each other, trapping the chemical compound to be measured from each portion, transferring the compound so separated from each portion into a different carrier gas to form a plurality of flows of the compound in different carrier gases, passing each said flows into a separate signal recording gas density detector in which each gas density detector cell is provided with reference gas of the same composition as the carrier gas and recording the signal output of the detector cells during the period of flow, the ratio of two signal outputs being a function of the molecular weight of the compound.

BRIEF SUMMARY OF THE INVENTION

In contrast with the prior art using the gas density detector for qualitative analysis of a volatile chemical compound in gas chromatography apparatus using repeat analyses in two different carrier gases, the present invention provides a method and apparatus for direct determination of both retention time and molecular weight whereby the chemical compounds are analyzed both qualitatively and quantitatively.

In the process of the present invention, the sample containing a chemical compound is divided into a plurality of portions having a fixed quantitative proportion to each other. The chemical compound in each portion is then individually trapped and subsequently transferred separately into different carrier gases so as to provide a plurality of flows of sample in the different carrier gases. Each flow of the chemical compound in its respective different carrier gas is then passed into a separate signal recording gas density detector of the gas density cell type in which each gas density cell is provided with a flow of reference gas of the same composition as the carrier gas in the sample flow. The signal output of the detector cells is recorded during the period of flow so as to form at least two curves, the ratio of the areas under which is a function of the molecular weight of the chemical compound.

The sample is usually divided into two portions which are treated similarly in two different carrier gases, but there are advantages in analysis using division into three or four portions and treating similarly in different carrier gases.

The carrier gases are substances differing in composition and molecular weight from the compounds in the sample to be analyzed. The carrier gases used are usually single component compounds which pass through the apparatus without change in composition. One carrier gas preferably is of higher molecular weight than the compound of the sample to be analyzed and the other is preferably of lower molecular weight than the compound of the sample to be analyzed. The carrier gases which are useful are chemical elements or compounds having molecular weights from 2 to 200 and even higher by using suitably high temperatures in the apparatus. Examples are: hydrogen, helium, argon, neon, krypton, nitrogen, carbon dioxide, carbon tetrafluoride, chlorotrifluoromethane, bromotrifluoromethane, dichlorodifluoromethane, trichlorofluoroethane, perfluoropropane ($C_3F_8$), sulfurhexafluoride ($SF_6$), octafluorocyclobutane and 1,1-difluoroethane. Hydrogen is rarely used because of its reactivity and possible explosion hazard. It is usually desirable to use compounds of purity better than 99 percent. Helium, nitrogen, or carbon dioxide is quite satisfactory for use as the low molecular weight carrier gas and sulfur hexafluoride or octafluorocyclobutane as the high molecular weight carrier gas.

The chemical compound of each sample flow is trapped in a trapping means described hereinafter. When the sample to be analyzed contains a single compound, the trap is a simple means for condensing or adsorbing the compound on the surface area of the trap. The atmosphere of the trap is then replaced by carrier gas and the sample is transferred into the carrier gas by heating the trap while flowing carrier gas through the trap to produce a flow of the compound in the carrier gas.

When the sample contains more than a single compound the trapping means is a two-stage trapping means and the mixture of compounds which are components of the sample is first trapped by a simple trap in the first stage and the mixture is transferred into the carrier gas by heating the trap while flowing carrier gas through the first stage trap to produce a flow of the mixture in carrier gas. The flow of mixture in the carrier gas is then passed into and through a chromatographic tube where there is a difference in retention times for the individual chemical compound components and, as a result, effluent from the chromatographic tube is a series of flows. Each flow of the series contains a single chemical compound in the carrier gas, the flows being in the relative order of their respective retention times.

Generally, the chromatographic tubes for the plurality of flows are substantially identical as to the retention properties. However, there are advantages in having them different so as to have different retention times. The retention times and molecular weights taken together are useful in identification as to chemical structure.

BRIEF DESCRIPTION OF THE DRAWINGS

The apparatus of the invention is briefly described for simplicity showing apparatus for dividing a sample into a pair of flows in two different carrier gases. It is to be understood that apparatus for dividing the sample into a plurality of flows in which three different carrier gases are used requires a divider for splitting the sample into three flows and three trapping means and three detectors similar to the diagrams wherein only two flows are shown.

FIG. 3 is a view similar to FIG. 1 but showing a third step of procedure with irrelevant portions of the apparatus omitted;

FIG. 4 is a view similar to FIG. 1 but showing a fourth step of procedure with irrelevant portions of the apparatus omitted;

FIG. 5 is a diagram of a pair of records produced by recorders and which are to be compared;

FIG. 6 consists of the more important equations explanatory of the theory and practice of operation.

DETAILED DESCRIPTION

Figure 1:
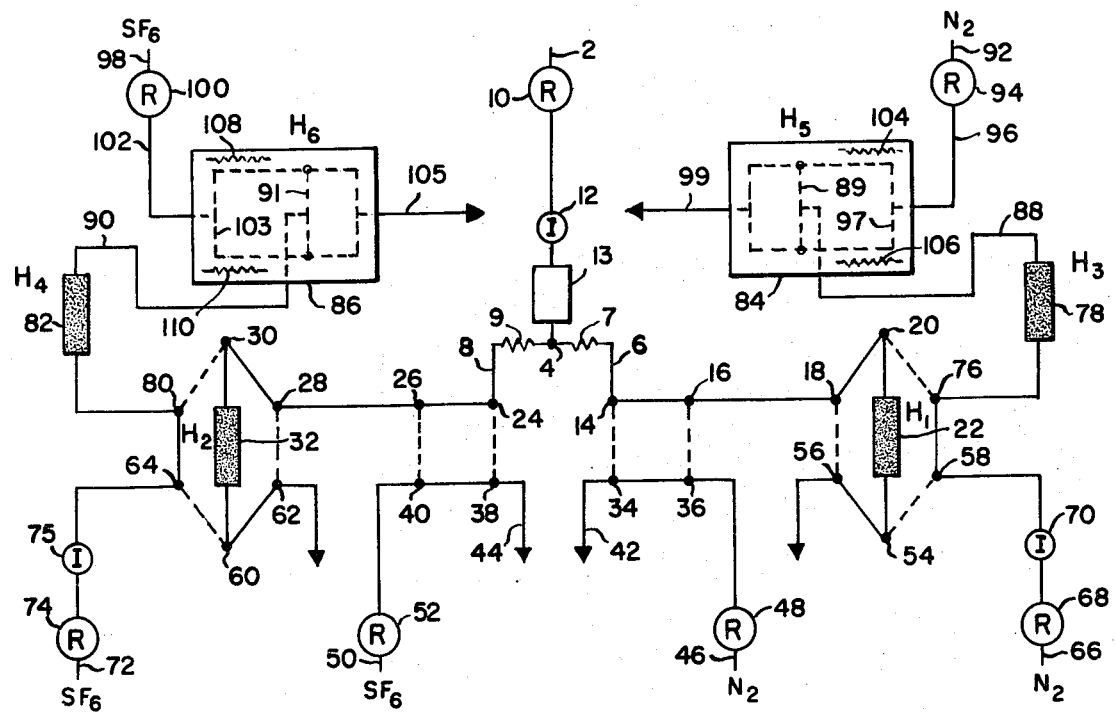
FIG. 1 is a diagram of a complete apparatus provided in accordance with the invention with a showing of the routing of flows in a first step of procedure.

FIG. 1 shows the apparatus as a whole, indicating the routing of flow in the first step of operation. Where valves are indicated, it is understood that many of these are used in ganged combination so that the control of one simultaneously controls another in the gang.

Describing first a particular construction, an inlet 2 may serve for the introduction, from a source under pressure, of a carrying gas which may be of any suitable type into which there is subsequently introduced the sample for which analysis is desired. This connection runs to a splitter tee 4 to provide division of flow through flow restrictors 7 and 9, into conduits 6 and 8, respectively, which restrictors may be physically provided by capillary tubing which need not be exactly matched in size and length. The reason for these restrictors, functioning like high electrical resistors, is to provide a reproducible division of two high speed flows essentially independent of variations in conditions beyond the conduits 6 and 8 which might affect the division of flow. For example, as will presently appear, the flows run to traps, changes of temperature of which, or changes of other conditions of which, can change the ratio of the respective flows, whereas if sufficient resistances are interposed by restrictors 7 and 9 the disturbances downstream will have negligible effect. In addition, the resistances essentially eliminate any gravitational effects, the resistors giving rise to high linear rates of flow proportional to pressures at the tee 4 due primarily to accelerations. The respective flows need not be equal; in fact, in many instances inequality will produce better results in view of different conditions in later parts of the apparatus and their operations. What is required is a nearly fixed ratio of the two flows so that results obtained in the handling of unknowns will be comparable with the handling of known materials during calibration.

The gas introduced at connection 2 may be provided from a supply bottle under pressure with regulation of rate of flow through a flow regulator 10 which, like other regulators hereafter described may be of the well-known type commonly used in gas chromatography. Beyond the flow regulator, there is a sample port 12 for introduction of solid, liquid or gaseous sample in conventional fashion. This injection port is preferably suitably heated so that the injected sample will be vaporized so as to be carried by the gas. It is desirable that immediately following the injection port there should be an enlarged chamber 13 to prevent an undue rise of pressure caused by sudden vaporization of the sample, better uniformity of the division being obtained when the pressure at the tee 4 remains approximately constant. Such a chamber is particularly desirable since the conventional regulator present at 10 usually has a rather slow response.

The dividers, capillary tubing, chromatograph tubes, gas density cells, valves and other parts of the apparatus may be made of glass, metal such as stainless steel, plastic or other material selected to be suitable for the particular samples and carrier gases used.

The foregoing describes a particular arrangement and operation in which the carrying gas is at an elevated pressure and the sample is injected beyond a regulator. However, the sample may be present in the carrying gas as it enters at 12, for example, if there is being analyzed a sample gas containing impurities, e.g. polluted air. While for consistency of description there will be referred to entry of gases under pressure, it will be evident that all that is required is a pressure gradient or gradients to produce flow, and consequently flow may be provided by the application of suction to various points which are referred to hereinafter as vents, with input at any desired pressure, for example atmospheric if contents of air are to be analyzed.

While the use of gas to carry the sample through the restrictive divider capillary tubes 7 and 9 is convenient and practical, it is to be understood that there are also advantages to the application of a suction in the flow lines to be described hereinafter for drawing the vaporized sample into the system through these capillary tubes.

The carrying gas for conveying the sample through the first part of the system up to the step of trapping the two portions of sample in their respective traps is not normally critical as to purity, since it is displaced subsequently by substantially pure carrier gases used for transferring the two portions of sample from their respective traps to the chromatographic separators. The substantially pure carrier gases used in this second step are selected from the gases known in the art and particularly those listed in the description of the method as described above.

The apparatus includes as components various valves which are manually set to selected positions, and those valves are most effectively shown by way of disclosure of their ports in the drawings, with indication in solid lines of connections which exist during the several steps in the operation, while in FIG. 1 alternative connections, not used in the initial step, are indicated in dotted lines. The physical valves themselves are not detailed since they are of conventional types and readily available.

The conduit 6 runs to valve 14 which, in the initial step, provides flow to valve 16 and thence to valves 18 and 20 and from valve 20 into trapping column 22. The valves are selectively operated or ganged where this is convenient and possible, so as to control the flow of gases as desired.

The apparatus is essentially symmetrical, and flow takes place from conduit 8 through the valves 24, 26, 28 and 30 into trapping column 32.

The right hand side of FIG. 1 shows valving which includes valves 34 and 36 and the left hand shows valving which includes valves 38 and 40 which are not utilized in the initial step of operation. The valves 34 and 38 are connected to respective vents 42 and 44.

At 46 there is an inlet connection which, for consistency of description may be said to receive a carrier gas such as nitrogen under pressure, the flow of which gas is controlled by a conventional regulator 48, so that the gas under controlled flow passes to valve 36 in a subsequent stage of operation. In similar fashion an inlet 50 is provided and connected to a pressure source of another gas which for consistency of description may be considered to be sulfurhexafluoride ($SF_6$), the flow of which is regulated by a regulator 52 from which a conduit runs to the valve 40. The gases nitrogen and sulfurhexafluoride serve in many instances as suitable carriers, the nitrogen having a molecular weight which is low and generally less than the molecular weights of the components of the samples, while the sulfurhexafluoride has a high molecular weight which is often greater than the molecular weights of the components of the samples and is of quite general utility because of its inertness and its high molecular weight.

The lower end of trapping column 22 is connected to a valve 54 to control flow either to a valve 56 which is connected to a vent, or to provide flow to another valve 58.

On the other side of the apparatus the lower end of the trapping column 32 is connected to a valve 60 which provides connection to a venting valve 62 or alternatively to a valve 64.

When the sample is drawn through the divider capillaries 7 and 9 by suction as described above, venting valves 56 and 62 are attached to a suction means such as a vacuum line so as to draw sample portions into the traps.

An inlet 66 connected to a source of nitrogen under pressure provides a flow of nitrogen through a flow regulator 68 and an auxiliary injection port 70 to the valve 58. In similar fashion an inlet 72 connected to a source of sulfurhexafluoride under pressure provides a flow of sulfurhexafluoride through a flow regulator 74 and thence through an auxiliary injection port 75 to the valve 64.

The auxiliary sample injection ports 70 and 75 are provided for the injection of known samples for calibration purposes as well as for quantitative analysis. These ports are used, for example, when samples are analyzed quantitatively for components of known molecular weights. In such qualitative analysis it is necessary to use only one side of the equipment and only one carrier gas. In this case the carrier gas which gives the largest response is used. Thus, it is advantageous to use the high molecular weight carrier gas such as sulfurhexafluoride in analyzing low molecular weight components and the low molecular weight carrier gas such as nitrogen or helium in analyzing high molecular weight components.

A valve 76 is connected to the lower end of a gas chromatograph column 78, while a corresponding valve 80 on the other side of the apparatus is connected to the lower end of a gas chromatograph column 82.

At this point it may be remarked that while, for simplicity of disclosure, multiple inlet connections to pressure sources of nitrogen and sulfurhexafluoride are indicated, and will be further indicated, these connections may be made to the same supplies of the respective gases and the several flow regulators may in some instances be the same regulators when they are not required to operate simultaneously, the routing of the gases being provided by suitable valving as will be obvious. Close-off valves, not known, are provided to open and shut inlets in obvious fashion at the sources.

Symmetrically provided in the apparatus are detectors such as density meters 84 and 86 which are of a well-known type described in detail in U.S. Pat. No. 3,050,984, dated Aug. 28, 1962, and elsewhere.

Each of the detectors 84 and 86 is of the type in which vertical passages are provided which have reception zones at their respective mid portions for reception of reference gas and for reception of the same gas carrying a sample. The reference gas passes in heat conductive relation with a pair of thermally responsive electrical detectors connected in a bridge circuit providing an output to a recorder which is part of each detector (though a dual recorder may serve for both) and not known per se. The gas containing the sample controls the flows of the reference gas by becoming admixed with the flowing reference gas, and the combined gases pass to a vertically centered outlet. The conduits connected to other apparatus are as follows:

The conduit 88 runs from the upper end of the column 78 to the mid portion of a vertical passage 89 in the detector 84, and in similar fashion a conduit 90 runs from the upper end of column 82 to the mid portion of a vertical passage 91 in the detector 86. An inlet 92 connected to a pressure source of nitrogen runs through flow regulator 94 and then through conduit 96 to the mid portion of the vertical passage 97 at the upper and lower ends of which connections are made to horizontally running extensions of the upper and lower ends of the passage 89. The flows unite and the combined discharge passes through the outlet conduit 99. This outlet may either be a vent, or it may be a conduit leading to a trapping column in the event the sample is to be retained for some further operation.

In similar fashion an inlet 98 connected to a pressure source of sulfurhexafluoride runs to a flow regulator 100 and thence through conduit 102 to the mid portion of the vertical passage 103, which corresponds to 97. The flow passages are similar to those previously described, outlet flow taking place through the conduit 105.

Indicated in the detector 84 are the respective upper and lower elements such as thermally-responsive elements 104 and 106, such as filaments or thermistors, while corresponding elements are designated 108 and 110 in the detector 86. The operation of the detectors is a conventional one in which variations in the upward and downward flows of the reference gases produce electrical unbalance of the thermally-responsive elements so as to provide operation of the corresponding recorder.

The various trapping columns 22 and 32, chromatographic columns 78 and 82, and detectors 84 and 86 are provided with heaters which are indicated in FIG. 1 at $H_1$ to $H_6$, inclusive. These heaters for the absorption columns and the density detectors are arranged to provide proper temperatures, thermostatically controlled, at various stages of the operation not only to these major components but also to connecting conduits with the objective of maintaining thermal stability, and in the case of the absorbing columns, also to provide conditions for holding and vaporization of the sample material. The temperatures maintained are, of course, selected to suit the particular materials which are involved.

For the same purpose and also to maintain gas compositions constant, except when intentionally changed, flows of carrier gases are maintained in all parts of the system whether actively involved in carrying out the individual steps of operation or not.

Reference may now be made to the operational steps in making a quantitative analysis of the constituents including their identification by their molecular weights in apparatus which has been calibrated and is ready for use. The operations will be first described without reference to theory.

FIG. 1 indicates in full lines the connections which are involved in the initial part of the operation which effects a division of a sample to be analyzed into two definitely related portions. In this initial phase of operation the trap heaters are ordinarily off (or at low heat) with the trapping columns 22 and 32, particularly at room or other low temperature, although if highly volatile materials are contained in the sample these may even be subjected to refrigeration. Assuming, for generality, that the carrier gas in the introduction step is a gas other than nitrogen or sulfurhexafluoride, it is desirable, in order to secure definiteness of division of the sample, when using a carrier gas before division, to have the carrier gas flow for a period preceding the sample introduction so as to secure uniformity of gas content particularly in the columns 22 and 32. Following this, an operable quantity of the sample is introduced into the injection port 12 while the gas is flowing from the inlet 2 and while heating the injection port 12, if necessary to maintain volatility, so as to accelerate vaporization of the sample. Definite division of the samples takes place at the splitter tee 4 from which the split flows are led to the columns 22 and 32.

The columns 22 and 32 are high surface chambers and usually contain an adsorbing material such as any of a great variety of adsorbing materials well-known in the art of gas chromatography, for example: Alumina, silica, clay, metal silicates, acrylic polymer beads, Apiezon L, Carbowax 20M, Silicone OV- 7, Squalane, Poropak P, Q, R, S, or T, glass beads, Teflon, activated charcoal, or mixtures. Various of those listed are proprietary products, sold under trademarks. The actions involved are essentially physical, and in the adsorption the action is in many cases essentially condensation, either on more or less inert porous material or in viscous liquid or semi-liquid coatings on inert carriers, or true molecular adsorption. The action involved in removal of the constituents is the reverse, i.e., essentially vaporization. Chemical reaction is not usually involved; and as will be pointed out later, the order of desorption that occurs is not entirely a function of molecular weight, or of chemical composition.

The adsorbing materials such as those just indicated have the property, when cold, of very quickly adsorbing the sample constituents from the influent gas with the desirable result that for all intents and purposed the entire content of the sample is held at the upper ends of these columns. It is not desirable at this stage to have the adsorption take place in a chromatographic fashion, i.e., distributed along the column, but rather the adsorption is desirably in small slugs occupying little of the column length with the ultimate objective of providing a compact source from which the sample materials in the two columns may be practically simultaneously and in a very short period driven off with heat and delivered into the chromatograph columns 78 and 82, thus increasing column efficiency.

At the time this sample-depositing step is carried out, it is convenient to prepare other portions of the apparatus for use, although this is merely a cleaning and stabilizing operation, by causing nitrogen to enter at inlet 66 and to pass into the bottom of column 78 and from it through conduit 88 to sweep through the passages in the detector 84 which also receives nitrogen from the inlet 92. A similar cleansing and stabilizing operation is carried out through the corresponding elements in the left hand portion of the apparatus by introducing sulfurhexafluoride at the inlets 72 and 98.

Figure 2:
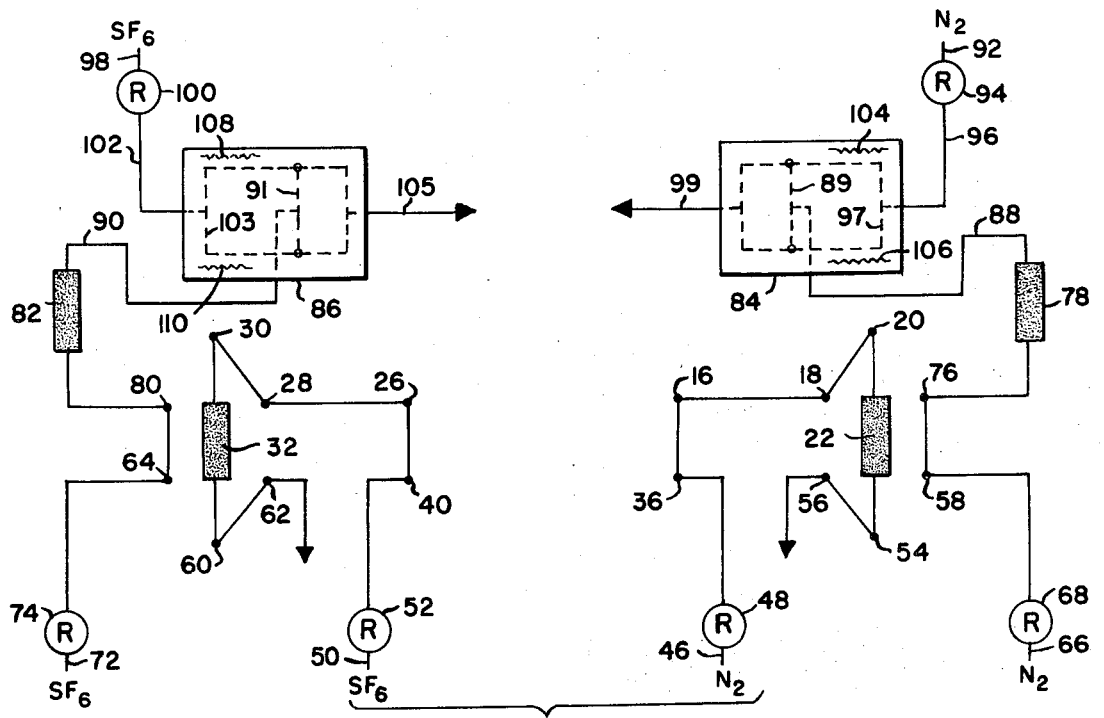
FIG. 2 is a view similar to FIG. 1 but showing a second step of procedure with omission of portions of the apparatus irrelevant to that step.

The second step in the operation is illustrated in FIG. 2 which, for simplicity, omits those elements of the apparatus which are not involved in this step, the auxiliary injection ports 70 and 75 being also omitted, though flow takes place therethrough, and also through the other passages to maintain stabilization.

The purpose of the second step is to replace in the columns 22 and 32 the carrying gas which was used to introduce the samples by, respectively, nitrogen and sulfur hexafluoride. One of these gases is suitably already in its proper half of the system if the same gas had been used originally by introduction at inlet 2. In the right hand portion of the apparatus, nitrogen is introduced at 46 and flows through the conduits illustrated downwardly through the column 22 (which remains cold) with venting at 56. In similar fashion sulfurhexafluoride introduced at 50 passes downwardly through the column 32. These operations are carried out sufficiently to insure that the two portions of the apparatus contain as gases the nitrogen and sulfurhexafluoride respectively. The conduit and valve connections to columns 78 and 82 and to the detectors 84 and 86 are the same as illustrated and described with reference to FIG. 1.

While the second step just described is desirable, and in some cases necessary, depending upon the carrier gases and the composition to be analyzed, in other instances this step may be omitted and when this is the case there may be corresponding simplification of the apparatus particularly in the matter of the valve connections preceding the trapping columns. Hence the described second step is not of the essence of the procedure.

The nest step is illustrated in FIG. 3, from which irrelevant portions of the apparatus are omitted, (though flows may continue for stabilizing as mentioned) and involves the purging of the samples from the trapping columns 22 and 32 into the chromatograph columns 78 and 82. The former are now heated and the latter remain cool, or are adjusted to a lower temperature than the trapping columns as necessary to get optimum absorption conditions. Nitrogen introduced at 66 is routed through the regulator into the lower end of column 22 and from which it removes the slug of sample and introduces it into the chromatograph column 78. In this last column, the stratification occurs in which the more volatile components of the sample usually become located higher in the column than the less volatile components. Nitrogen freed from the components now located in the column 78, flows outwardly and may be conveniently routed as indicated through the passages in the detector 84. Similar operations, effected by sulfurhexafluoride entering at 72 take place, displacing the slug of sample from column 32 into the chromatograph column 82, the former being heated and the latter remaining cool or being cooled or heated at a lower temperature.

The columns 78 and 82 suitably contain chromatographic absorbing material of any of a wide variety of types, and these materials may be the same as those previously described as used in the trapping column. From the many column fillers which are available choices may be made of those giving best results for particular classes of materials and carriers, though little differences are noted in comparing the operations of different adsorbing materials. Controlled temperatures are selected to secure optimum results. A "trapping" action may be produced at lower temperatures whereas at higher temperatures better stratification may occur, with separation of the components rather than their accumulation in limited slugs. The separation effective in these columns provides for the later introduction into the detectors of the sample components in a sequence beginning with the most volatile and ending with the least volatile.

The final step of operation is illustrated in FIG. 4, there being here omitted, as before, the irrelevant portions of the apparatus through which flows continue, as stated. What is carried out in this final step is the displacement of the sample components, beginning with the most volatile into and through the detectors to provide records. Nitrogen introduced at 66 has its rate of flow controlled by regulator 68 and enters the column 78 to displace the sample components through the detector 84. The column 78 is heated to a temperature suitable for the components involved and the ambient temperature of the detector 84 is also maintained constant and also at a suitable value. The detector now operates in conventional fashion, reference nitrogen being introduced at a regulated flow rate through the connection 92 and the flow regulator 94. As is known for this type of detector, the relative densities of the two flows now come into play so that the rates of flow of the reference nitrogen past the elements 104 and 106 create unbalance of the electrical bridge which is recorded. The same type of operation occurs in the left hand portion of the apparatus, except that sulfurhexafluoride now constitutes the displacing gas and also the reference gas. There is, of course, a reversal of the conditions involved in that the reference nitrogen would have a lower density than nitrogen containing the components heavier than it, while the reference sulfurhexafluoride would have a greater density than the portions of sulfurhexafluoride containing the sample components lighter than it. This fourth step of programmed elution to detectors using the nitrogen and sulfurhexafluoride carrier gases may be carried out either simultaneously or successively, the same electrical recorder being possibly used in the latter instance.

When a single component sample is being analyzed, it is possible to use only the first named traps by making the exchange to pure carrier gas therein and then heating the traps so as to form an admixture with the carrier gas so as to create flows which carry the sample in pure carrier gas directly to the gas density cells. The sample in the trap is allowed to flow from either its inlet end or from its outlet end directly to the gas density cells. This procedure differs from the base in which the gas is passed to chromatographic tubes for separation of a multicomponent sample, in that a multicomponent sample is preferably allowed to pass from the first named trap through the inlet end by reversal of gas flow. The reason for removal from the trap by reversal of flow is so that no separation of sample takes place prior to the development of separation in the chromatographic tubes.

The advantages of the apparatus and procedure of the present invention will now be clear. The sample is divided into two portions being a known quantitative relationship to each other and are handled in substantially identical fashions. Any difference in handling, due to the use of the two carrying gases, is constant from run to run, and from the standpoint of the production of the density records the result achieved in each recorder is the same resulting in direct comparison so that in the two records the components can be easily identified. As is well know, the quantitative amount (weight) of a constituent is determined by the area of the peak produced in the recorder chart as compared to an area produced by a standard sample. With proper rates of flow through the chromatograph columns, the records consist of a constant baseline graph (resulting when the components are not passing through the detector) with peaks occurring whenever the components are passing. The sequence of the peaks and their spacings can be recognized as definitive of the components. This recognition, of course, is afforded particularly by calibration. The calibration is carried out by the introduction of known samples at the auxiliary injection ports 70 and 75, the nitrogen and sulfurhexafluoride being introduced at controlled rates first to build up the array of the components in the chromatograph columns 78 and 82 and then to transfer them serially through the respective detectors to give basic graphs corresponding thereto. Maintenance of constant chosen conditions makes the results comparable so as to achieve high accuracy of identification and measurements.

Under some conditions simplifying variations of the apparatus may be used, For example, it is possible that the trapping columns 22 and 32 may be bypassed by introduction of the sample in the two flows directly into the chromatograph columns 78 and 82 through injection ports 70 and 75. However, it is more generally desirable to utilize the trapping columns 22 and 32 to accumulate first slugs of the divided sample, thus to avoid such differences as might arise from the direct introduction which introduces added error not involved in the usual injection and splitting procedure above described. The slug accumulation on the traps, without any substantial separation of constituents, permits the further operations to be carried out simultaneously under simultaneously existing conditions as to temperature, pressure and flow rates.

With proper precautions and added valving for gas purging and introduction of another gas, a single detector may, of course, be used.

FIG. 5 shows two graphs $G_1$ and $G_2$ which are the comparable graphs produced by the recorders operated by the signal outputs of the gas density cells. Each consists of a number of peaks, and under normal conditions of simultaneously feeding the series of flows from the chromatographic columns to the detectors, the sequences of the peaks on the two graphs produced will correspond, i.e., peaks which are produced at corresponding positions in the two sequences such as $P_1$ and $P_2$, represent the measurements of the same component of an unknown (or of a known substance in calibration). The relative areas of these peaks are of consequence and are determined by the use of a planimeter or graphically, or by electronic integrator.

The operation of a density measuring cell, arbitrarily referring to one of the pair shown, produces data which are related in accordance with equation (1) of FIG. 6, in which:

$W_1$ is the actual weight of a particular component of the unknown sample producing a single peak in passing through the cell;

$A_1$ is the corresponding area of the single peak in the graph of the response of that cell to the passage of that component;

$K_1$ is the cell constant;

$M_x$ is the molecular weight of the carrier gas used for carrying that component through the cell, and also used as a reference gas.

$M_{c1}$ is the molecular weight of the carrier gas used for carrying that component through the cell, and also used as a reference gas.

Likewise the corresponding relation of data for the second cell is given in equation (2) of FIG. 6 in which:

$W_2$ is the actual weight of a particular component of the unknown sample producing a single peak;

$A_2$ is the corresponding area of the single peak in the graph of the response of that cell to the passage of that component;

$K_2$ is the cell element constant which is separately determined $M_x$ is the molecular weight of that component which produces the peak, and $M_{c2}$ is the molecular weight of the second carrier gas used in that cell.

Since the total weight of the component, $W_T$ is the sum of $W_1$ and $W_2$, and $W_1$ and $W_2$ are related according to the splitting ratio $a_1 : a_2$, $$W_T = \frac{W_1}{a_1} = \frac{W_2}{a_2}$$

and from this the expression (3) and (4) follow:

By substituting (1) in expression (3), and (2) in expression (4)

$$W_T = \frac{A_1 k_1}{a_1}\left(\frac{M_x}{M_x - M_{cf}}\right) = \frac{A_2 k_2}{a_2}\left(\frac{M_x}{M_x - M_{c2}}\right)$$

there is obtained equation (5) in which $(k_1)/(k_2) \cdot (a_2)/(a_1) = K$.

$K$ is thus a constant for the apparatus which is determined by passing any known pure sample through the analytical process. Normal heptane is a satisfactory pure material which can be used for this purpose. When $K$ is substituted for $(k_1)/(K_2) \cdot a_2)/(a_1)$ in equation (5), the following equation is obtained.

(6) $$K \frac{A_1}{A_2} = \frac{M_x - M_{c1}}{M_x - M_{c2}}$$

By designating $K \cdot (A_1)/(A_2)$ to be a constant $Y$, $$Y = \frac{M_x - M_{c1}}{M_x - M_{c2}}$$

and $YM_x - YM_{c2} = M_x - M_{c1}$ which by rearranging becomes $YM_x - M_x = YM_{c2} - M_{c1}$ or $(Y - 1) M_x = YM_{c2} - M_{c1}$ which on dividing by $(Y - 1)$ becomes equation (7):

$$M_x = \frac{YM_{c2} - M_{c1}}{Y - 1}$$

After solving for $K$ using a known pure compound as indicated above and using one gas, $Y$ can be similarly found by repeating the process with a pure compound such as normal heptane and two different carrier gases and measuring the areas $A_1$ and $A_2$. The value of $Y$ is a function of the constant $K$ and the ratio of the areas $A_1$ and $A_2$ and is calculated by substituting the value of $K$ and the experimentally measured areas $A_1$ and $A_2$ in the equation (8): $Y = (K A_1)/(A_2)$. By substituting the value of $Y$ and the molecular weights of the carrier gases $M_{c1}$ and $M_{c2}$ in equation (7), the molecular weight of the sample is calculated. If there are several components in a sample resulting in several peaks the equation can be set up in a computer so that only the ratio $A_1/A_2$ for each component needs to be changed for each molecular weight determination of the several components.

It is to be noted that when calibrating the apparatus with a pure sample, the pure sample should be one with a molecular weight greater than that of the carrier gas used so as to correct for the slight difference which may occur between pairs of gas density cell thermally responsive resistors.

The apparatus of this invention provides a simultaneous measurement of two portions of a sample whereby errors due to fluctuations in temperatures, flow rates, and pressures cancel out, and the constants determined for the apparatus and used in the calculations are fixed. Moreover, the apparatus using the splitter and plural flow system provides easy and accurate control of heating and cooling, as required, in such a manner that a true comparison of the two portions of split sample is obtained. As a result, accurate measurement of molecular weight of sample components is readily achieved.

While it is possible to use apparatus according to the present invention comprising a sample splitter, a plurality of traps, including when desired, a simple trap and chromatographic tube trap in series and then not a plurality but a single gas detector cell to analyze first the sample in one trap in one carrier gas and then a sample in another trap in a different carrier gas and thus simplify the apparatus, such apparatus has one of the serious disadvantages of the prior art, namely, the time required to thoroughly clean the first carrier gas from the detectors system before using it for the second different carrier gas. The present invention using a plurality of gas detectors overcomes this disadvantage. The present invention does not, however, exclude the non-simultaneous analysis of the flows from the trap systems whereby a single recorder can be used first for recording peaks of one flow and then recording peaks of a second flow. Such a system is useful when using for example three chromatograph flows and only one dual pen recorder.

It is obvious that the process of this invention is not limited to the division of a flow of gas into two samples portions and comparison of the sample in two different gases, since additional sample portions can be compared in a third and even a fourth different gas for greater accuracy. Furthermore, columns with different packing materials can be used and this is particularly advantageous when a third and a fourth portion in a third and fourth different additional gas is used. The data therefrom will provide greater accuracy and precision in identifying components of complex mixtures. When quantitative analysis is desired, the apparatus is calibrated with a known weight of a known compound, and the molecular weight and absolute weight of one component of the sample injected must be known. In the case of an unknown sample, a known percent of a known compound can be mixed with the sample to produce a sample for this purpose.

The above description applies more particularly to qualitative analysis. The formulas given above are used in this calculation, e.g., $$W_{tx} = k_1 A_x \frac{M_x}{M_x - M_c}$$

In the first calculation, $k_1$ is calculated using a known weight of the known sample $W_{t_x}$ of known molecular weight $M_x$ and known molecular weight of carrier gas $M_c$ to obtain the area $A_x$. Then this $k_1$ is used in the same formula where $W_{t_x}$, $M_x$ and $A_x$ are respectively weight, molecular weight and area under the curve for the unknown in the sample.

What is claimed is:

1. Apparatus for measurement of a function of the molecular weight of a volatile component of a sample comprising:
   a. means for dividing a flow of sample containing a chemical compound into a plurality of flows each containing a portion of said sample in a fixed proportion to each other;
   b. separate trapping means disposed in each of said flows for separating and releasing each of said chemical compound portions from its respective flow,
   c. means associated with each of said trapping means for entraining the respective separated chemical compound portions in different flows each of a different carrier gas;
   d. detector means including a plurality of gas density detector cells capable of providing an electrical signal that varies in accordance with the difference in flow rates of a reference gas and said reference gas modified by a content of a compound of different molecular weight, said detector cells being provided with a reference gas inlet and a sample gas inlet, said sample gas inlet being flowably connected with its respective trapping means.

2. Apparatus of claim 1 in which the sample dividing means is a means for dividing the sample into a plurality of flows not exceeding four.

3. Apparatus of claim 2 in which the sample dividing means is a means for dividing the sample into a pair of flows.

4. Apparatus of claim 3 in which each trapping means is heat controlled and is a high surface area vessel having substantially no differential retention properties.

5. Apparatus of claim 3 in which each trapping means is a two stage trapping means wherein the first stage includes means for transferring a plurality of chemical compound components from each sample flow as a mixture into a carrier gas and the second stage includes means for separating chromatographically said plurality of chemical compound components into a series of flows of individual chemical compounds in the respective carrier gas.

6. Apparatus of claim 5 in which the two stage trapping means includes a first stage trapping means having substantially no differential retention properties for entraining the respective separated chemical portions and a second stage trapping means having substantial differential retention properties and valving means therebetween whereby flow from the first stage trapping means to the second stage trapping means is controlled.

7. A method for measurement of the molecular weight of a volatile chemical compound component of a sample comprising: chemical compound into a plurality of flows of portions having a fixed quantitative ratio to each other;
   a. simultaneously dividing a sample containing a chemical compound into a plurality of flows of portions having a fixed quantitative ratio to each other;
   b. simultaneously trapping the chemical compound from each of said portions and simultaneously transferring said chemical compound of each of said portions into a different carrier gas to form a plurality of sample flows in respective different carrier gases;
   c. simultaneously passing each said flow into a separate signal recording gas density detector of the gas density cell type in which each gas density cell is provided with a flow reference gas of the same composition as the carrier gas in the sample flow; and
   d. simultaneously recording the signal outputs of the detector cells during the period of flow, said signal outputs being a function of the molecular weight of said chemical compound.

8. The method of claim 7 in which the sample consists of an individual chemical compound in a carrier gas and steps $b$ and $c$ comprise the steps of trapping each chemical compound, purging the carrier gas therefrom with said different carrier gas and detrapping each chemical compound into its respective different carrier gas.

9. The method of claim 7 in which the plurality of sample portions does not exceed four.

10. The method of claim 9 in which the sample is transferred into a first carrier gas of different chemical structure than the chemical compound component of the sample to be measured to form a sample flow and the sample flow is divided into a plurality of sample flows, from which flows each compound component is subsequently separated from the first carrier gas before being transferred into said different carrier gas.

11. The method of claim 10 in which the sample contains a plurality of chemical components to be measured and the plurality of chemical components is first trapped from the carrier gas as a plurality of mixtures of chemical components, each said mixture is transferred into a different carrier gas and chromatographically separated into a plurality of flows in respectively different carrier gases, each flow comprising a flow of the chemical compound component in the respective carrier gas serially separated from each other in order of the chromatographic retention time of each chemical compound.

12. The method of claim 11 in which the chemical components of the mixtures in different carrier gases are chromatographically separated on chromotographic columns having different adsorbent properties so as to provide a plurality of flows in which the retention times are different in each flow.

13. The method of claim 12 in which both retention time and molecular weight are determined from the data as a means of chemical identification.

* * * * *